(12) United States Patent
Lewis

(10) Patent No.: US 12,101,440 B1
(45) Date of Patent: Sep. 24, 2024

(54) DYNAMIC PRECISION QUEUE ROUTING

(71) Applicant: United Services Automobile Association (USAA), San Antonio, TX (US)

(72) Inventor: Joseph Reed Lewis, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/184,829

(22) Filed: Mar. 16, 2023

Related U.S. Application Data

(63) Continuation of application No. 17/396,622, filed on Aug. 6, 2021, now Pat. No. 11,632,467, which is a continuation of application No. 16/363,161, filed on Mar. 25, 2019, now Pat. No. 11,115,536.

(60) Provisional application No. 62/649,096, filed on Mar. 28, 2018.

(51) Int. Cl.
| | |
|---|---|
| *H04M 3/00* | (2024.01) |
| *H04L 12/66* | (2006.01) |
| *H04M 3/51* | (2006.01) |
| *H04M 3/523* | (2006.01) |
| *H04M 5/00* | (2006.01) |

(52) U.S. Cl.
CPC ....... *H04M 3/5233* (2013.01); *H04M 3/5166* (2013.01); *H04M 3/5232* (2013.01)

(58) Field of Classification Search
CPC .... H04M 3/51; H04M 3/5175; H04M 3/5158; H04M 3/5191; H04M 3/5183; H04M 3/523; H04M 3/5235; H04M 3/42102; H04M 3/42042; H04M 2207/203; H04M 2242/30; H04M 3/42348; H04M 3/5232; H04L 65/1069; H04L 67/02; H04L 67/10; H04L 65/1006; H04L 65/4007; H04L 45/26; H04L 61/106; H04L 61/1541; H04L 29/0809; H04L 51/04; H04L 41/18; H04L 49/25; H04L 67/142; H04L 67/24; H04L 67/306; H04L 2012/6472; G06Q 10/06315; G06Q 30/016; G06Q 10/063112; G06Q 10/06398; G06Q 10/06393
USPC ............ 379/266.07, 265.09, 266.01, 265.01, 379/201.01, 309, 265.1, 266.08; 370/352
See application file for complete search history.

(56) References Cited

U.S. PATENT DOCUMENTS

| | | | | |
|---|---|---|---|---|
| 5,590,188 | A | * | 12/1996 | Crockett ................ H04Q 3/665 379/265.14 |
| 6,243,092 | B1 | | 6/2001 | Okita |
| 7,899,177 | B1 | * | 3/2011 | Bruening ............ H04M 3/5232 379/265.11 |
| 8,831,206 | B1 | | 9/2014 | Fagundes |
| 2004/0133876 | A1 | * | 7/2004 | Sproule .................. G06Q 10/10 717/105 |
| 2006/0209797 | A1 | * | 9/2006 | Anisimov ............. H04M 7/006 370/352 |
| 2008/0095355 | A1 | | 4/2008 | Mahalaha |
| 2011/0116618 | A1 | | 5/2011 | Zyarko |

(Continued)

*Primary Examiner* — Kharye Pope
(74) *Attorney, Agent, or Firm* — Perkins Coie LLP

(57) ABSTRACT

Disclosed is a precision queuing (PQ) system that automatically and dynamically revises the values of precision queue step rules (PQSRs) with customizable thresholds based on current contact center conditions such as varying hours of operation and number of agents available.

20 Claims, 4 Drawing Sheets

(56) References Cited

U.S. PATENT DOCUMENTS

| | | | |
|---|---|---|---|
| 2012/0263293 A1* | 10/2012 | Vasquez | H04M 3/5233 |
| | | | 379/265.12 |
| 2014/0140497 A1* | 5/2014 | Ripa | H04M 3/5175 |
| | | | 379/265.06 |
| 2014/0146961 A1* | 5/2014 | Ristock | H04M 3/5234 |
| | | | 379/265.11 |
| 2014/0177821 A1* | 6/2014 | Ristock | G06Q 10/0631 |
| | | | 379/266.08 |
| 2014/0270136 A1 | 9/2014 | Thomson | |
| 2015/0358463 A1 | 12/2015 | O'Connor | |
| 2016/0127553 A1* | 5/2016 | McCormack | H04M 3/5191 |
| | | | 379/265.03 |
| 2016/0155080 A1* | 6/2016 | Gnanasambandam | |
| | | | G06Q 10/063112 |
| | | | 379/265.03 |

\* cited by examiner

402

| Step | Condition | Value | Wait Time |
|---|---|---|---|
| 1 | Agent Has PQ Attributes | 1–3 | 20 seconds |
| 2 | Agent Has PQ Attributes | 1–5 | 10 seconds |
| 3 | Agent Has PQ Attributes | 1–10 | |

| Step | Condition | Value | Wait Time |
|---|---|---|---|
| 1 | Agent Has PQ Attributes | 1–3 | 20 seconds |
| 2 | Agent Has PQ Attributes | 1–5 | 10 seconds |
| 3 | Agent Has PQ Attributes | 1–10 | |

| Step | Condition | Value | Wait Time |
|---|---|---|---|
| 1 | Agent Has PQ Attributes | 1–10 | |
| | | | |
| | | | |

| Step | Condition | Value | Wait Time |
|---|---|---|---|
| 1 | Agent Has PQ Attributes | 1–10 | 20 seconds |
| 1.5 | (All Agents) | (1–10) | |
| | | | |
| | | | |

*FIG. 4D*

DYNAMIC PRECISION QUEUE ROUTING

CROSS-REFERENCE TO RELATED APPLICATIONS

This application is a continuation of U.S. patent application Ser. No. 17/396,622, filed on Aug. 6, 2021, entitled "DYNAMIC PRECISION QUEUE ROUTING," which is a continuation of U.S. patent application Ser. No. 16/363,161 (now U.S. Pat. No. 11,115,536), filed on Mar. 25, 2019, entitled "DYNAMIC PRECISION QUEUE ROUTING," which claims priority to U.S. Provisional Application No. 62/649,096, filed on Mar. 28, 2018, entitled "DYNAMIC PRECISION QUEUE ROUTING," all of which are hereby incorporated by reference in their entireties for all purposes.

TECHNICAL FIELD

This technology is related to call routing, and more specifically to dynamic precision queue routing of calls.

BACKGROUND

Precision Routing provides multidimensional call routing with simple configuration, scripting, and reporting capabilities. Precision Routing works by using multidimensional precision queues (PQs) that are created based on predefined business criteria corresponding to agent attributes. Agents then become members of these precision queues based on each agent's attributes and the agents are represented through multiple attributes with proficiencies so that the capabilities of each agent are accurately exposed. As such, a combination of attributes may be used to create multidimensional precision queues, and, using scripting, the precision queues may be dynamically mapped to direct a call to the agent to better match the specific needs of the caller.

However, there are times when the static logic used by the member inbound routing scripts do not provide the most efficient and effective delivery of calls to an available phone agent. For example, where precision queue steps are set to look for coded thresholds, adjustments to such thresholds have to be made manually (and then would be again static until subsequently adjusted manually).

SUMMARY

Various implementations disclosed herein are directed to a precision queuing (PQ) system that would automatically and dynamically revise the values of precision queue step rules (PQSRs) with customizable thresholds based on current contact center conditions such as varying hours of operation, number of agents available, and other relevant criteria. For example, if the precision queue step rules are set to utilize a ten (10) second time threshold to search for available agents in the current agent pool before increasing the agent pool in the next step, then the dynamic precision queuing system might change the Precision Queue Step Rules values—e.g., to twenty (20) seconds when customizable threshold conditions are met, or to five (5) seconds when different customizable threshold conditions are met—in order to improve delivery and provide greater flexibility in routing member inbound calls to an appropriate agent.

Accordingly, several implementations disclosed herein are directed to methods for dynamically modifying steps in a precision queuing call routing system, the method comprising: determining a modification event; identifying a modification action corresponding to the modification event; and executing the modification action on at least one precision queuing script. Certain implementations disclosed herein are directed to a system for precision queuing call routing, the system comprising: means for determining a modification event; means for identifying a modification action corresponding to the modification event; and means for dynamically executing the modification action on at least one precision queuing script. Select implementations disclosed herein are directed to computer-readable media comprising computer readable instructions for dynamically modifying steps in a precision queuing call routing engine, the computer-readable instructions comprising instructions that: determine a modification event; identify a modification action corresponding to the modification event; and execute the modification action on at least one precision queuing script.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings:

FIG. 4A is a table-based illustration representing an exemplary PQ script utilized by the CRE to route a caller to a best-fit agent;

FIG. 4B is a table-based illustration representing an exemplary PQ script utilized by the CRE to route a caller to a best-fit agent but where one or more values (here, the Wait Time for Step 1) is dynamically and automatically modified based on an external consideration (here, the time of day);

FIG. 4C is a table-based illustration representing an exemplary PQ script utilized by the CRE to route a caller to a best-fit agent but where one or more values (here, the Step 1 value) is dynamically and automatically modified based on an external consideration (here, when the minimum expected delay exceeds a threshold, not shown);

FIG. 4D is a table-based illustration representing an exemplary PQ script utilized by the CRE to route a caller to a best-fit agent but where one or more values (here, both the Step 1 value and the substitution of new final Step 1.5) is dynamically and automatically modified based on an external consideration (here, when the call center escalation status exceeds a threshold, not shown)

DETAILED DESCRIPTION

Figure 1:
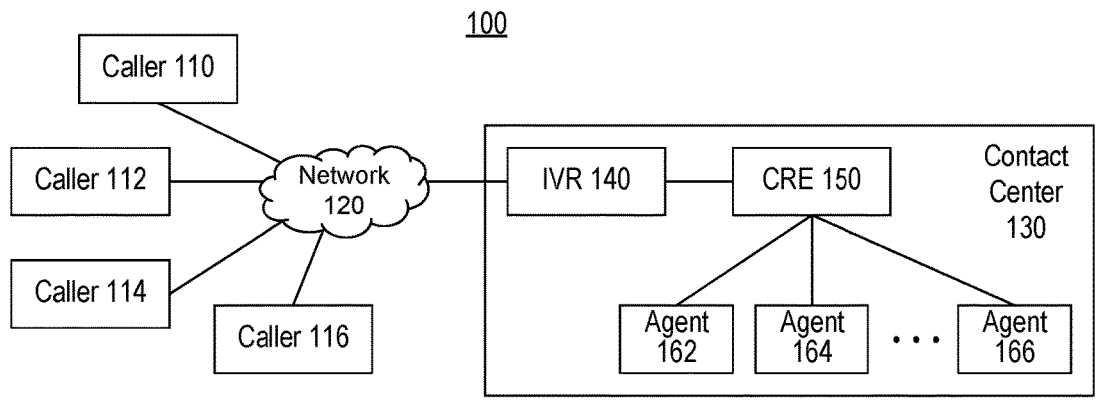
FIG. 1 is an illustration of a communications network environment in which the various implementations disclosed herein may be utilized.

An in-bound call center (or "contact center") is a centralized office comprising a group of "agents" for receiving a plurality of inbound calls requesting product support, providing answers to questions, and performing other related tasks. A call center agent is a person who handles incoming or outgoing customer calls for the contact center. An agent may be located in a call center or may be a mobile agent who connects to the call center by phone and VPN. Each agent may be identified in the system by one or more of a username, peripheral, last name and first name, and/or description, and a list of allowed actions may be associated with each agent. Using a combination of agents, IVR (discussed below), and support functions, many contact centers are organized to serve as the central point from which all in-bound calls may be managed, in which case such contact centers may be implemented as a part of a company's customer relationship management operations.

Contact centers generally leverage computer telephony integration (CTI)—sometimes referred to as "computer-telephone integration"-which generally refers to technology that allows interactions on a telephone and a computer to be integrated or coordinated, and often specifically refers to server-based functionality such as automatic call routing (ACR) utilized by an in-bound call center. Many CTI solutions, in turn, utilize an interactive voice response (IVR) system that may initially help determine where to most appropriately route each received call based on responses provided by the caller to specific questions presented by the IVR.

In addition to using an IVR, many CTI solutions are implemented using Voice over Internet Protocol (VoIP)—also referred to as "Voice over IP," "IP telephony," "Internet telephony," "broadband telephony," and other variations thereof-which is a methodology and group of technologies for the delivery of voice communications and multimedia sessions over Internet Protocol (IP) networks such as the Internet. As such, VoIP (and its equivalents and alternatives) is a term that specifically refers to the provisioning of communications services over the Internet rather than via the public switched telephone network (PSTN), and the similarities and differences between VoIP and PSTN are worth noting.

For example, in the PSTN, telephone calls are routed across a network comprising a plurality of switching systems that may be owned by different telephone carriers. These switching systems are connected via trunks, and each switch may have many neighbors. When neighboring switches are owned by different operators, they are referred to as interconnect points. However, the PSTN is not a fully meshed network (i.e., with every operator network connected to every other operator network, which would be both impractical and inefficient), and therefore calls may be routed through intermediate operator networks before they reach their final destination. As such, an important procedure in PSTN routing is the determination of the most efficient and least costly route.

In the PSTN, each exchange in the chain uses pre-computed routing tables to determine which connected exchange the onward call should be routed to. There may be several alternative routes to any given destination, and the exchange can select dynamically between these different alternatives in the event of link failure or congestion. The routing tables are generated centrally based on the known topology of the network, the numbering plan, and analysis of traffic data. One approach to PSTN routing involves the use of Dynamic Alternative Routing (DAR) that makes use of the distributed nature of a telecommunications network and its inherent randomness to dynamically determine optimal routing paths to generate a distributed, random, parallel computing platform that minimizes congestion across the network and is able to adapt to take changing traffic patterns and demands into account.

By comparison, the steps and principles involved in originating VoIP telephone calls are similar to traditional digital telephony and involve signaling, channel setup, digitization of the analog voice signals, and encoding. However, instead of being transmitted over a circuit-switched network, the digital information is packetized and transmission occurs as IP packets over a packet-switched network. Various codecs exist that optimize the data stream based on application requirements and network bandwidth where some implementations may rely on narrowband and compressed speech while others support high-fidelity stereo codecs.

Automated call routing is a call management capability wherein a call is automatically sent to a specific queue after being qualified by the telephony system. Any number of reasons can cause a call to be routed to a queue: call volume, time of day, language preference of the caller, specific department requested, and so forth. Calls also may be routed using a front-end IVR system that initially helps determine where to most appropriate route each call based on responses provided by the caller to specific questions presented by the IVR. In this way, call routing may be used to optimize human resources costs by utilizing agents as efficiently as possible and help ensure that calls are always routed to the best available agent for each such call. By routing calls based on agent expertise, availability, location, or any other differentiating criteria, inbound callers can be provided with a better overall customer experience.

There are several specific types of call routing. Time-based routing routes callers to representatives based on the time of day that the call is received. Time-based routing is often used to help companies provide service round the clock (i.e., 24/7/365). For example, companies with offices nationwide might route callers to an office on the east coast during hours that west coast offices aren't open and, conversely, calls during hours after the east coast office is closed may be routed to a west coast office. Likewise, during hours that neither office is open, calls may be routed to a "24-hour" call center or a call center located overseas. This approach helps companies assure the maximum level of service available at a given time as well as standardize (if not normalize) business hours for customers from multiple locations and time zones.

Similarly, some companies may utilize skills-based routing in order to route callers to the most qualified agent available. In this regard, there may be several factors that could be used to determine which agents are most qualified for a specific call. For example, skills-based routing may route the caller to an agent who can most efficiently and effectively meet their needs based on the phone number called, the choices selected by the caller in a front-end IVR, the caller's previous interactions with the call center, and the tags of the agents. Moreover, with a skills-based routing system, a company could automatically route calls to the right specialist. Similarly, by using call tracking solutions to determine the callers intent, a skills-based routing system could anticipate the caller's needs and send the call to a specialist in the corresponding area of skill or expertise that might best meet that client's needs.

In skills-based routing, calls may be pre-screened before reaching an agent. For example, a caller might dial a number that specifically corresponds to the department that handles one specialized need, and the system would seek an available (or soon-to-be available) agent who can fulfill that specialized need. Moreover, for certain implementations, certain calls might not only start in a front-end IVR system but also end up in a specialized back-end IVR system as an alternative to utilizing a live agent (e.g., to alleviate the network strain caused by high call volume) or to fulfill a routine task (such as provide balance and payment information on an account).

A call routing engine (CRE)—also known as a call routing system (CRS) or an automatic call distributor (ACD)—is a call-processing tool that routes inbound calls to individual agents or queues based on one or more pre-established criteria. Early CREs were implemented as hardware solutions but have evolved over time into software-based components found in many modern computer telephony integration (CTI) systems. CREs may implement and follow complex rules when routing calls, like considering how many skilled agents to leave open to receive highly specialized calls (e.g., reserving a highly-fluent Spanish-speaking agent when demand for the Spanish queue is higher than average). In this manner, existing call routing solutions look at all of the skills to which an agent belongs and defines the hierarchy of skills to map business needs. However, traditional routing is restricted by its single dimensional nature.

Precision Routing, on the other hand, provides multidimensional call routing with simple configuration, scripting, and reporting capabilities. Precision Routing works by utilizing multidimensional precision queues that are created based on predefined business criteria corresponding to agent attributes. Agents then become members of these precision queues based on each agent's attributes. Stated differently, in Precision Routing agents are represented through multiple attributes with proficiencies so that the capabilities of each agent are accurately exposed, bringing more value to the call center. Moreover, a combination of attributes may be used to create multidimensional precision queues and, using scripting, the precision queues may be dynamically mapped to direct a call to the agent to better match the specific needs of the caller. As such, Precision Routing requires the creation of precision queues that in turn are formed by the routing scripts.

Precision Routing is a feature available with Cisco Unified Contact Center Enterprise (Unified CCE or "UCCE"), Release 9.0.

In general, Precision Routing (or simply "precision routing") comprises following tasks: creating attributes; assigning attributes to agents; creating precision queues; creating routing scripts. A precision queue, in turn, comprises terms, expressions, and steps.

Attributes identify a call routing requirement such as language, location, or agent expertise. There are two types of attributes: Boolean and Proficiency. Boolean attributes are attributes that indicate a binary-type TRUE/FALSE value with regard to each agent. For example, a "Boston" attribute would indicate TRUE only for to an agent located in Boston. Proficiency attributes, on the other hand, are attributes used to indicate a level of expertise within a predefined range such as, for example, in a range from 1 to 10 with 10 being the highest level of expertise.

Precision queues are queues that comprise a combination of steps each having attributes, defined terms for the selected attributes, Wait Times, and "Consider If" determinations. As such, a precision queue step is a time-based routing point within the precision queue. When creating precision routing queues (or simply "precision queues"), attributes that are part of a queue are identified and implemented in the queue script. When an attribute is assigned to an agent, that agent is automatically associated with all precision queues that contain that attribute and matching criteria.

A "term" is a threshold value against which an agent's attribute is compared. For example, the term for a language attribute might be "English >6" where the agent's language proficiency in the English language must be greater than level 6 in order to meet the threshold indicated by the term.

An "expression" is a collection of one or more terms that are interrelated via Boolean logical operators such that, for example, requiring that an agent speak English above level 6, be located in Texas, and be proficient in sales (e.g., above level 4), then the expression for this collection of terms (i.e., combination of thresholds) would be "English >6 AND Dallas=TRUE AND Sales >4".

A "step" is a collection of one or more expressions arranged in a logical sequence of occurrence (akin to a process flow diagram), and a precision queue requires at least one step be defined. A step may also include Wait Time and Consider If aspects. Wait Time is used to assign a maximum amount of time for the CRE to wait for an available agent while on a specific step. Consider If is a conditional inquiry used to evaluate whether to execute the step based on specific determinable criteria. Accordingly, each step may have unique attributes, a different pool of agents, a Wait Time, and/or a "Consider If" formula. In particular, a precision queue term compares an attribute against a value. For example, if you have an attribute for English (English) and assign it a value of >7, the term is "English >7". Many precision queues may exist in the system, each precision queue comprising many queue steps, and each precision queue step comprising a plurality of precision queue terms. Additionally, an agent may be a member of a plurality of precision queues. In a precision queue system (PQS) having precision queues (PQs), the steps and scripts for said steps comprise the precision queue step rules (PQSRs) for that CRE.

As stated above, a "Consider If" expression is used to evaluate a call (within a step) against additional criteria. Each time a call reaches a step with a Consider If expression, the expression is evaluated. If the value for the expression returns as TRUE, the call is considered for the step. If the value returns as false, the call moves to the next step. If a step has no Consider If expression, the step is executed. Also of note, in many implementations a Wait Time and/or a Consider If aspect cannot be utilized in the last step because, by being last, there is not subsequent step for the Wait Time or Consider If aspect to progress to.

Notably, there exists no system for automatically and dynamically adjusting the precision queue step rules (PQSRs) in existing CRE (including the Cisco UCCE). As such, there are times when the static logic utilized by the member inbound routing scripts do not provide the most efficient and effective delivery of calls to an available phone agent. For example, where precision queue steps are set to look for coded thresholds, adjustments to such thresholds have to be made manually (and then would be again static until subsequently adjusted manually).

Accordingly, various implementations disclosed herein are directed to a precision queuing system that would automatically and dynamically revise the values of the precision queue step rules (PQSRs)—including, for example, Cisco UCCE Precision Queue Step Rules—with customizable thresholds based on current contact center conditions such as varying hours of operation, number of agents available, and so on and so forth. For example, if the precision queue step rules are set to utilize a ten (10) second time threshold to search for available agents in the current agent pool before increasing the agent pool in the next step, then the dynamic precision queuing system might change the PQSRs' values—e.g., to twenty (20) seconds when customizable threshold conditions are met, or to five (5) seconds when different customizable threshold conditions are met—in order to improve delivery and provide greater flexibility in routing member inbound calls to an appropriate agent.

FIG. 1 is an illustration of an example of a communications network environment 100 in which the various implementations disclosed herein may be utilized. The environment 100 includes one or more callers 110, 112, 114, 116 and a contact center 130 connected to each other by a network 120, for example, the PSTN or (for VoIP implementations) the Internet, or alternatively a wide area network (WAN) or a local area network (LAN). The contact center comprises an IVR system 140 operationally coupled to a CRE 150 which, in turn, is operatively coupled to a plurality of agents 162, 164, 166. The callers 110, 112, 114, 116 and/or the various components of the contact center 130 may utilize one or more computing devices. An example computing device is described with respect to FIG. 6.

In view of FIG. 1, certain implementations disclosed herein are directed to a system for precision queuing call routing, the system comprising: means for determining a modification event; means for identifying a modification action corresponding to the modification event; and means for dynamically executing the modification action on at least one precision queuing script.

Figure 2:
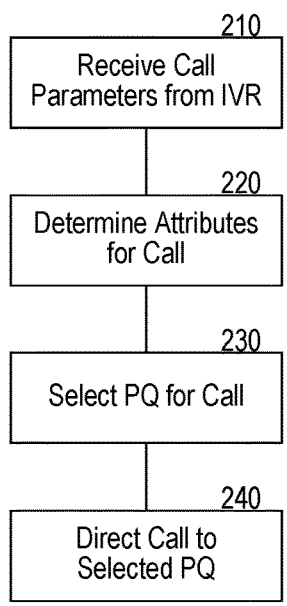
FIG. 2 is a process flow diagram illustrating call flow for an in-bound call received by a CRE (call routing engine) from an inbound IVR (interactive voice system) for a caller.

FIG. 2 is a process flow diagram illustrating call flow for an in-bound call received by a CRE (call routing engine) 150 from an inbound IVR (interactive voice system) 140 for a caller 110, 112, 114, 116. At 210, the call is received by the CRE 150 from the IVR 140 to include parameters for the call as determined by the IVR. At 220, the CRE 150 then determines the agent attributes necessary for the call and, at 230, selects a corresponding PQ (precision queue) for the call. At 240, the CRE then directs the call to the selected PQ so that the call can then be handled by the most appropriate agent from among the plurality of agents 162, 164, 166 based on a script comprising steps for determining the optimum available agent 162, 164, 166 to handle the call within an appropriate amount of time, for example.

In view of FIG. 2, several implementations disclosed herein are directed to methods for dynamically modifying steps in a precision queuing call routing system, the method comprising: determining a modification event; identifying a modification action corresponding to the modification event; and executing the modification action on at least one precision queuing script.

Figure 3:
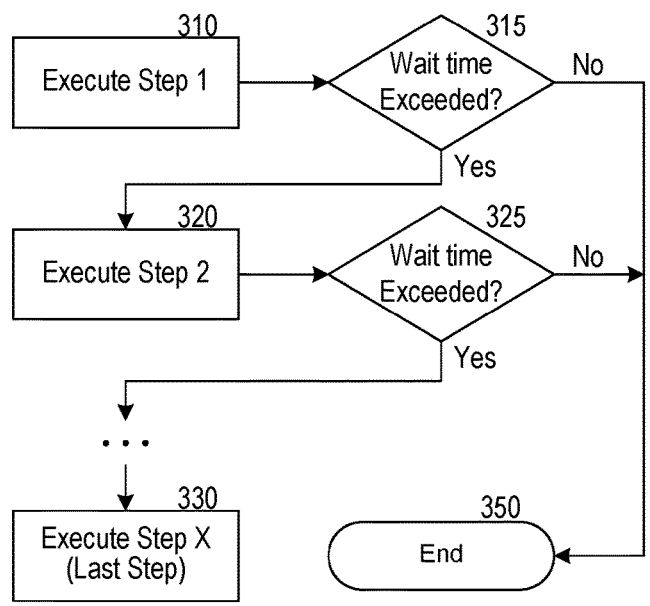
FIG. 3 is a process flow diagram illustrating execution of a PQ (precision queue) script selected by the CRE illustrated in FIG. 2.

FIG. 3 is a process flow diagram illustrating execution of a PQ script selected by the CRE illustrated in FIG. 2. At 310, the first step (comprising an expression and terms) is executed and, if the call is successfully routed to an agent before the expiration of the Wait Time per 315, then the script was successful at optimally routing the call within the allotted time in the first step 310 and the process flow 300 then ends at 350. However, if the Wait Time expires at 315, then the script proceeds at 320 to execute the second step. If the call is then successfully routed to an agent before the expiration of the Wait Time per 325, then again the process flow 300 ends at 350. However, if the Wait Time expires at 325, then the script proceeds to 330 to execute the third step.

In view of FIG. 3, select implementations disclosed herein are directed to computer-readable media comprising computer readable instructions for dynamically modifying steps in a precision queuing call routing engine, the computer-readable instructions comprising instructions that: determine a modification event; identify a modification action corresponding to the modification event; and execute the modification action on at least one precision queuing script.

FIG. 4A is a table-based illustration representing an example of a PQ script 402 utilized by the CRE 150 to route a caller 110 to a best-fit agent 162, 164, 166. The script comprises three steps 412—step 1 422, step 2 424, and step 3 426—each having an associated condition 414 and a related value 416 wherein the value 416 is a term and the condition 414 is an expression for operation consistent with a threshold defined by that term (if any). Except for the last step (step 3 426), each step 412 (specifically step 1 422 and step 2 424) also has an associated Wait Time 418 which is the maximum amount of time allotted for each step to successfully connect the caller 110 with an agent 162, 164, 166 that meets the value 416 of the condition 414 before the next subsequent step is executed (having different condition/value expression, and one that is presumably easier to meet time-wise despite being less ideal skill-wise).

For example, at step 1 422 the call will be connected to an agent having the required PQ attributes (per the condition 414 and value 416, i.e., "1-3") unless no such agent is available within the corresponding Wait Time 418 limit ("20 seconds"), in which case step 2 424 is invoked to connect the caller with an agent based on a broader skill value (per value 416 of "1-5"). However, if step 2 424 cannot find such an agent within the time allotted (per corresponding Wait Time 418 limit "10 seconds"), then step 3 426 is invoked and, being the last step and having no corresponding Wait Time 418 limit, will continue until a qualified agent is available to handle the call. As such, the collection of steps 412 for this script collectively equate to the step rules for the precision queue.

However, for the script 402 illustrated in FIG. 4A, there exists no capability for automatically and dynamically adjusting the precision queue step rules (PQSRs) in existing CREs (including the Cisco UCCE). As such, there are times when the static logic utilized by the member inbound routing scripts do not provide the most efficient and effective delivery of calls to an available phone agent. For example, where precision queue steps are set to look for coded thresholds, adjustments to such thresholds have to be made manually (and then would be again static until subsequently adjusted manually).

Various implementations disclosed herein are directed to a precision queuing system that would automatically and dynamically revise the values of the precision queue step rules (PQSRs)—including, for example, Cisco UCCE Precision Queue Step Rules—with customizable thresholds based on current contact center conditions such as varying hours of operation, number of agents available, and so on and so forth.

FIG. 4B is a table-based illustration representing an exemplary PQ script 404 utilized by the CRE 150 to route a caller 110 to a best-fit agent 162, 164, 166 but where one or more values (here, the Wait Time 432 for Step 1 422) is dynamically and automatically modified 432 based on an external consideration (here, the time of day, not shown).

Specifically, the CRE 150 is configured to implement the following dynamic and automatic PQSR modification 432 (i.e., to real-time change the default PQSR 402 of FIG. 4A to an "improved" PQSR 404 of FIG. 4B: "If LocalTime <8:00 am, then set Step 1 Wait Time to 5 seconds" whereby when the local time is before 8 am the Wait Time for Step 1 422 is only five seconds, not the default 20 seconds.

This automatic and dynamic change enables in-bound calls to be escalated to subsequent steps (specifically, Step 2 424 more quickly when the call cannot be answered immediately by an agent (presumed unavailable) because of, for example, the relative expected call volume versus the planned agent staffing in view of expected optimum efficiency to maximize caller satisfaction (in this case, by avoiding unnecessary waiting at Step 1 422 when no waiting might otherwise be expected and the higher skilled agent resources need not be protected/preserved).

FIG. 4C is a table-based illustration representing an exemplary PQ script 406 utilized by the CRE 150 to route a caller 110 to a best-fit agent 162, 164, 166 but where one or more values (here, the Step 1 422 value 416) is dynamically and automatically modified 442 based on an external consideration (here, when the minimum expected delay exceeds a threshold, not shown). Specifically, the CRE 150 is configured to implement the following dynamic and automatic PQSR modification 442 (i.e., to real-time change the default PQSR 402 of FIG. 4A to an "improved" PQSR 404 of FIG. 4C): "If MinExpDelay >300 seconds, then set Step 1 Value to 1-10," whereby when the minimum expected delay for an agent to be available to address an inbound call exceeds a threshold (e.g., 300 seconds) for the default PQSR configuration having value 1-3, and thus changes the value to 1-10 to overcome this extensive delay.

This automatic and dynamic change 442 enables in-bound calls to be directed to a wider range of agents and, by implication, more quickly because, for example, of the actual expected call volume greatly exceeds the relative expected call volume because of a specific event that requires an inordinate number of moderately skilled agents that are in fact inadequate in number but can be effectively increased by including highly skilled agents into the mix (in this case, agents having attribute values 4-10 available for Step 1, unlike before).

In this instance, the net effect of this PQSR modification 442 is to make Step 1 424 the last step in fact, thus obviating any need for a Wait Time 418, which is removed 444, and also obviating the need for further steps 424 and 426, which are also removed 424' and 426'.

FIG. 4D is a table-based illustration representing an exemplary PQ script 408 utilized by the CRE 150 to route a caller 110 to a best-fit agent 162, 164, 166 but where one or more values (here, both the Step 1 422 value 416 and the substitution of new final Step 1.5 428) is dynamically and automatically modified 442 and 452 based on an external consideration (here, when the call center escalation status exceeds a threshold, not shown). Specifically, the CRE 150 is configured to implement the following two dynamic and automatic PQSR modifications 442 (i.e., to real-time change the default PQSR 402 of FIG. 4A to an "improved" PQSR 404 of FIG. 4C) for "If CallCenterEscStatus=RED, then . . . ": (1) " . . . set Step 1 Value to 1-10," whereby the default PQSR configuration having value 1-3 is changed to 1-10; and (2) " . . . add step 1.5 for PQ-All," whereby a new step 428 is added to the script between Step 1 422 and Step 2 424 to effectively suspend PQ attribute filtering and become the last step.

These automatic and dynamic changes 442 and 452 enable in-bound calls to be immediately directed to a much wider range of agents and, by implication, to do so more quickly because, for example, of the actual expected call volume greatly exceeding the relative expected call volume for of a specific "RED" condition that requires a maximum number of agents (even those unskilled in the PQ area) to be effectively increased by immediately including highly skilled agents into the mix at Step 1 422 (in this case, agents having attribute values 4-10 available for Step 1, unlike before) and, after the 20-second Wait Time 418 of Step 1 422 expires, utilizing new Step 1.5 428 to route the call to the first available agent 454 regardless of PQ attributes 456.

In this instance, the net effect of this PQSR modifications 442 and 452 is to make Step 1.5 428 the last step in fact, thus obviating any need for further steps 424 and 426 which are effectively removed 424' and 426'.

Figure 5:
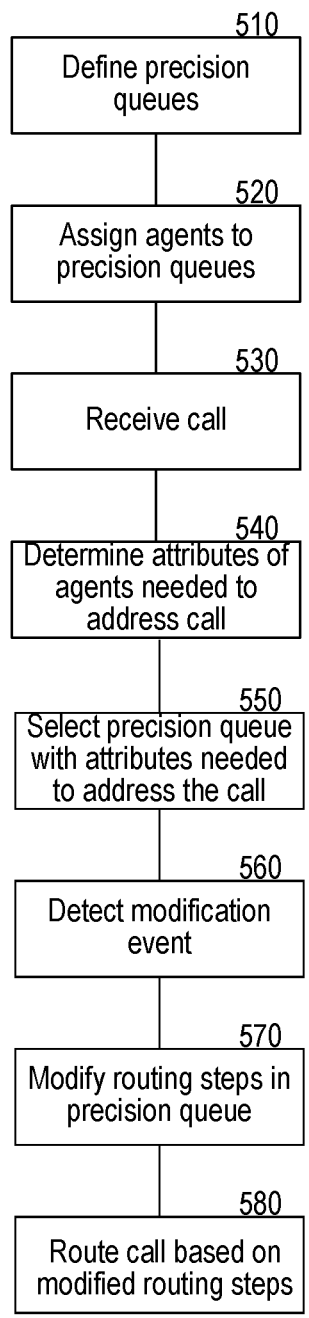
FIG. 5 is a process flow diagram illustrating an example of dynamic precision queue routing.

FIG. 5 is a process flow diagram 500 illustrating an example of dynamic precision queue routing. Defining operation 510 defines a plurality of precision queues that include routing steps for routing calls. Each precision queue is associated with attributes such as expertise in an area. Assigning operation 520 assigns each agent to one or more precision queues based on the attributes associated with each agent. Receiving operation 530 receives a call from a customer. Determining operation 540 determines the attributes of the agents needed to address the call. Selecting operation 550 selects a precision queue in the plurality of precision queues with the attributes needed to address the call. Detecting operation 560 detects a modification event that modifies the routing steps in the selected precision queue. Detecting the modification can include determining contact center conditions such as time of day, available agents and attributes of available agents. Modifying operation 570 modifies the routing steps according to the modification event. In some implementations, the routing steps of multiple precision queues are modified based on the modification event. Modifying the routing steps can include modifying a call wait time before proceeding to a next routing step, modifying the attributes of the agents needed to answer the call, or adding or removing routing steps. Routing operation 580 routes the call based on the modified routing steps.

Figure 6:
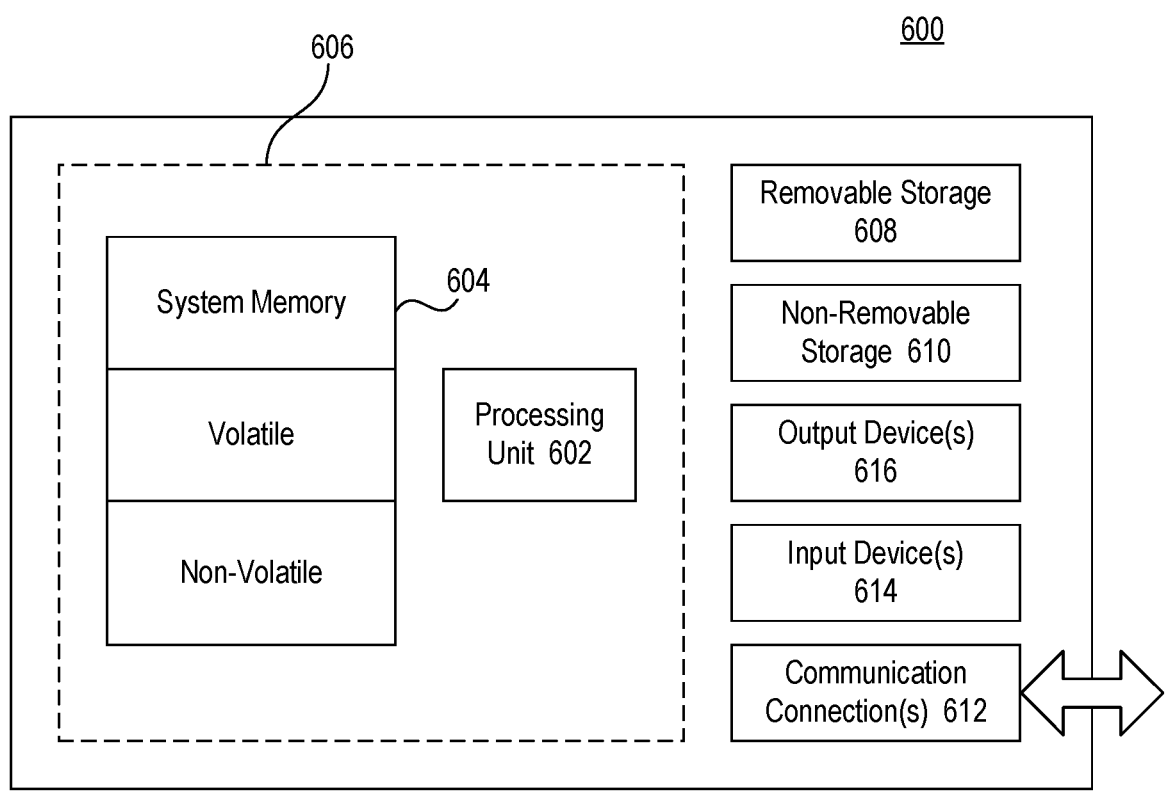
FIG. 6 shows an example of a computing environment.

FIG. 6 shows an example of a computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, a system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for dynamically modifying routing steps in a precision queuing call routing system, the method comprising:
   defining a multi-step precision queue for a subject matter,
      wherein the multi-step precision queue is associated with two or more routing steps,
      wherein at least one of the two or more routing steps includes a predetermined consider-if condition to evaluate whether to dynamically route calls, stored in a queue, to available agents without waiting for an amount of time specified by a wait time criteria for the queue to expire;
   assigning a set of agents to the multi-step precision queue based on the subject matter and at least one attribute associated with the set of agents;
   in response to receiving a call from a caller, determining one or more attributes of agents needed to address the call;
   selecting the multi-step precision queue from available queues based on the one or more attributes; and
   routing, to at least one available agent of the set of agents, the call based on the two or more routing steps of the selected multi-step precision queue.

2. The method of claim 1, further comprising:
   detecting a modification event that modifies a particular routing step, of the two or more routing steps, in the selected multi-step precision queue,
      wherein the modification event causes a change to the wait time criteria defined for the particular routing step.

3. The method of claim 2,
   wherein detecting the modification event includes determining contact center conditions, and
   wherein the contact center conditions include at least one of: a time of day, available agents, or the one or more attributes of the available agents.

4. The method of claim 1, further comprising:
   modifying a particular routing step, of the two or more routing steps, by modifying a call wait time based on a time of day.

5. The method of claim 1, further comprising:
   modifying a particular routing step, of the two or more routing steps, by adding a new routing step or removing at least one of the two or more routing steps.

6. The method of claim 1, further comprising:
   modifying a particular routing step, of the two or more routing steps, by modifying the one or more attributes of the agents needed to address the call.

7. The method of claim 1, further comprising:
   determining the one or more attributes of the agents needed to address the call based at least in part on a time of day, a time zone in which the call is received, and at least one previous interaction of the caller with a call center.

8. A system comprising:
one or more processors; and
one or more memories storing instructions that, when executed by the one or more processors, cause the system to perform a process for dynamically modifying routing steps in a precision queuing call routing system, the process comprising:
- defining a multi-step precision queue for a subject matter,
  wherein the multi-step precision queue is associated with two or more routing steps,
  wherein at least one of the two or more routing steps includes a predetermined consider-if condition to evaluate whether to dynamically route calls, stored in a queue, to available agents without waiting for an amount of time specified by a wait time criteria for the queue to expire;
- assigning a set of agents to the multi-step precision queue based on the subject matter and at least one attribute associated with the set of agents;
- in response to receiving a call from a caller, determining one or more attributes of agents needed to address the call;
- selecting the multi-step precision queue from available queues based on the one or more attributes; and
- routing, to at least one available agent of the set of agents, the call based on the two or more routing steps of the selected multi-step precision queue.

9. The system according to claim 8, wherein the process further comprises:
detecting a modification event that modifies a particular routing step, of the two or more routing steps, in the selected multi-step precision queue,
wherein the modification event causes a change to the wait time criteria defined for the particular routing step.

10. The system according to claim 9,
wherein detecting the modification event includes determining contact center conditions, and
wherein the contact center conditions include at least one of: a time of day, available agents, or the one or more attributes of the available agents.

11. The system according to claim 8, wherein the process further comprises:
modifying a particular routing step, of the two or more routing steps, by modifying a call wait time based on a time of day.

12. The system according to claim 8, wherein the process further comprises:
modifying a particular routing step, of the two or more routing steps, by adding a new routing step or removing at least one of the two or more routing steps.

13. The system according to claim 8, wherein the process further comprises:
modifying a particular routing step, of the two or more routing steps, by modifying the one or more attributes of the agents needed to address the call.

14. The system according to claim 8, wherein the process further comprises:
determining the one or more attributes of the agents needed to address the call based at least in part on a time of day, a time zone in which the call is received, and at least one previous interaction of the caller with a call center.

15. A non-transitory computer-readable medium storing instructions that, when executed by a computing system, cause the computing system to perform operations for dynamically modifying routing steps in a precision queuing call routing system, the operations comprising:
- defining a multi-step precision queue for a subject matter,
  wherein the multi-step precision queue is associated with two or more routing steps,
  wherein at least one of the two or more routing steps includes a predetermined consider-if condition to evaluate whether to dynamically route calls, stored in a queue, to available agents without waiting for an amount of time specified by a wait time criteria for the queue to expire;
- assigning a set of agents to the multi-step precision queue based on the subject matter and at least one attribute associated with the set of agents;
- in response to receiving a call from a caller, determining one or more attributes of agents needed to address the call;
- selecting the multi-step precision queue from available queues based on the one or more attributes; and
- routing, to at least one available agent of the set of agents, the call based on the two or more routing steps of the selected multi-step precision queue.

16. The non-transitory computer-readable medium of claim 15, wherein the operations further comprise:
detecting a modification event that modifies a particular routing step, of the two or more routing steps, in the selected multi-step precision queue,
wherein the modification event causes a change to the wait time criteria defined for the particular routing step.

17. The non-transitory computer-readable medium of claim 16,
wherein detecting the modification event includes determining contact center conditions, and
wherein the contact center conditions include at least one of: a time of day, available agents, or the one or more attributes of the available agents.

18. The non-transitory computer-readable medium of claim 15, wherein the operations further comprise:
modifying a particular routing step, of the two or more routing steps, by modifying a call wait time based on a time of day.

19. The non-transitory computer-readable medium of claim 15, wherein the operations further comprise:
modifying a particular routing step, of the two or more routing steps, by adding a new routing step or removing at least one of the two or more routing steps.

20. The non-transitory computer-readable medium of claim 15, wherein the operations further comprise:
determining the one or more attributes of the agents needed to address the call based at least in part on a time of day, a time zone in which the call is received, and at least one previous interaction of the caller with a call center.

\* \* \* \* \*